Jan. 19, 1971     O. E. McKEE     3,556,558
TRAILER HITCH

Filed Aug. 12, 1968     3 Sheets-Sheet 1

INVENTOR.
OSCAR E. McKEE

BY *Featherstonhaugh & Co.*

ATTORNEYS

Jan. 19, 1971   O. E. McKEE   3,556,558
TRAILER HITCH

Filed Aug. 12, 1968   3 Sheets-Sheet 2

*INVENTOR.*
OSCAR E. McKEE

BY *Fetherstonhaugh & Co.*

ATTORNEYS

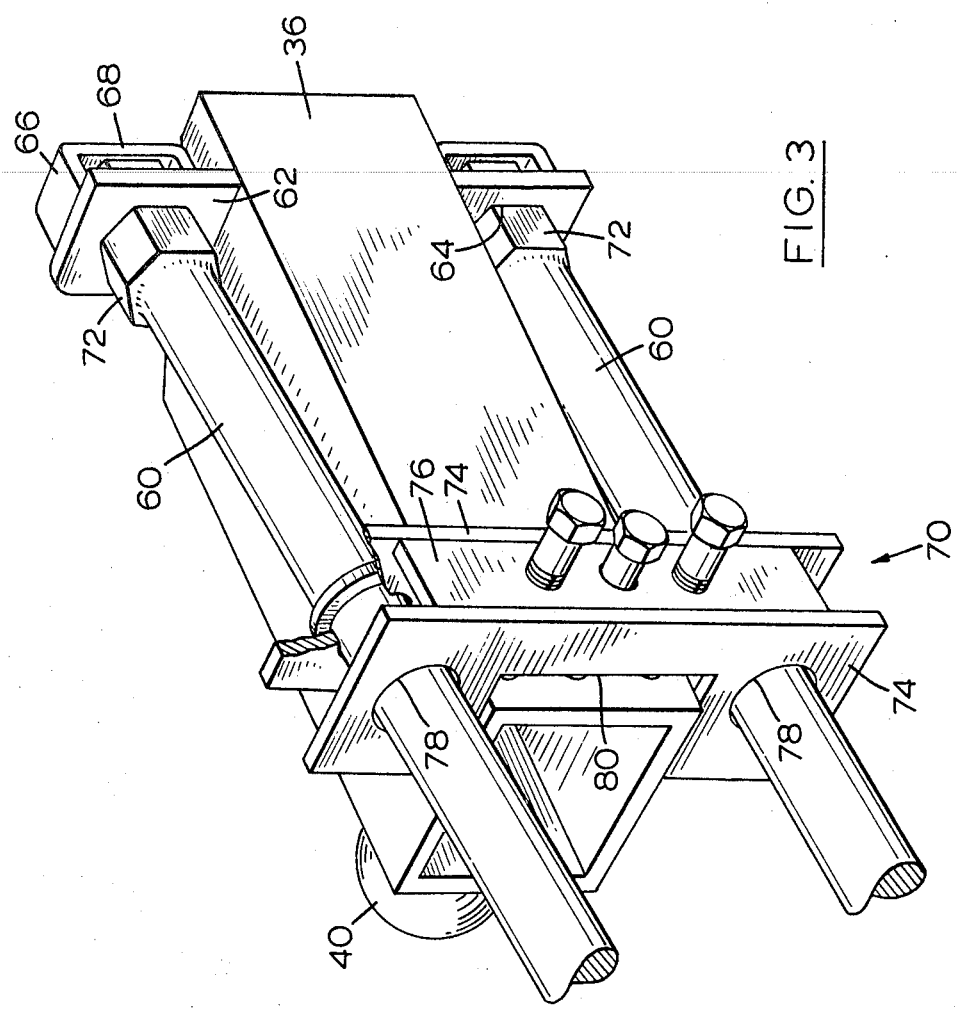

United States Patent Office 3,556,558
Patented Jan. 19, 1971

3,556,558
TRAILER HITCH
Oscar E. McKee, 209 Pathfinder Drive,
Cooksville, Ontario, Canada
Filed Aug. 12, 1968, Ser. No. 752,066
Int. Cl. B62d 53/00
U.S. Cl. 280—406                         15 Claims

ABSTRACT OF THE DISCLOSURE

This invention relates to a trailer hitch for connecting a tractor to a trailer. The hitch includes a draw bar which has a primary pivot point connected to the tractor vehicle adjacent to the rear axle thereof and a secondary pivot point located at the rear end of the tractor vehicle and connected to the trailer vehicle. The secondary pivot is provided with horizontal pivot control means for preventing horizontal pivoting about the secondary pivot point until horizontal pivoting about the primary point is completed. The horizontal pivot control means also includes means for adjusting the horizontal pivoting force required to permit horizontal pivoting about the secondary pivot point. The secondary pivot point control means also includes stabilizer rods and a stabilizer bar which cooperate to urge the draw bar into normal axial alignment with the trailer. The present invention also provides load adjustment means for distributing the load applied to the tractor vehicle by the trailer. Preferably and conveniently the load adjustment means and horizontal pivot control means are combined in a single structure.

BACKGROUND OF INVENTION

This invention relates to trailer hitches. In particular this invention relates to a trailer hitch which provides improved control of the direction of movement of the trailer.

The problems associated with the towing of a trailer are well known and a great many attempts have been made to provide trailer hitches which will improve the direction control which the towing vehicle has over the trailer. However most of the trailer hitches which have been designed have been complicated to manufacture and to install and have experienced little or no popular acceptance. The most common trailer hitch still in use includes a simple ball and socket joint located adjacent the rear end of the tractor vehicle. One of the disadvantages of this structure lies in the fact that the turning point of a tractor vehicle such as an automobile is located at the rear axle of the vehicle which is spaced a substantial distance inwardly from the rear end of the vehicle with the result that when the front end of the vehicle moves to one side the rear end of the vehicle moves in the opposite side direction. The movement of the trailer vehicle follows the movement of the rear end of the vehicle and consequently moves in the opposite direction from the front end of the tractor. This characteristic of the conventional trailer hitch frequently results in damage to the trailer when pulling away from a stop and causes undesirable side movement during towing.

The difficulties experienced in attempting to control the direction of movement of a trailer, particularly when backing up can be considerably reduced by locating the forward end of the pivot point adjacent the rear axle of the tractor vehicle. This gives substantially the same effect as the positioning of the fifth wheel of a tractor trailer above the drive wheels. However the practical problem with this structure is that in most conventional automobiles the rear wheels are spaced a substantial distance inwardly of the rear end of the automobile. If a simple trailer hitch was located adjacent the rear axle of most automobiles and extended rearwardly therefrom the arc of lateral movement would be limited by the chassis or underside of the vehicle. Furthermore for ease of coupling it is desirable to provide a draw bar which can be coupled up at the rear of the automobile rather than in an awkwardly positioned location adjacent to the rear axle of the automobile. In addition it will be noted that it is necessary that a draw bar should permit both horizontal and vertical pivoting of the trailer relative to the tractor and where the only pivot point is located adjacent to the rear axle of the tractor the vertical pivoting would be severely restricted where the tractor was an automobile.

Some attempts to overcome the difficulties experienced in towing trailers have suggested the use of draw bars having directional control means for controlling the direction of the movement of the trailer in response to the movement of the tractor. In U.S. Pat. 3,191,967, dated June 29, 1965, Conrad J. Penk, describes an apparatus of this type which includes two pivot points. One of the pivot points is a conventional trailer hitch pivot which is connected at the rear end of the tractor vehicle the other pivot mounting includes gear means causing the trailer to move in a predetermined direction in response to transverse pivoting of the draw bar at its connection with the trailer. While this apparatus provides a certain degree of control when moving the trailer in the reverse direction it does not prevent the exaggerated movement of the trailer which occurs as a result of the location of the coupling adjacent the rear end of the vehicle and further it does not provide any means whereby the pivoting about the coupling which is attached to the tractor will be completed before pivoting about the pivot which is connected to the trailer commences.

A further difficulty which is experienced in the towing of a trailer results from the weight of the trailer bearing down on the draw bar and applying a very heavy load to the rear end of the vehicle. Where the coupling point is located at the rear end of an automobile and the support frame is connected to the chassis of the automobile the rear end of the automobile will very frequently be overloaded thus causing the front end of the automobile to be raised and reducing the weight on the front wheels of the automobile with a resulting loss in the steering control. This problem is very obvious and can be very clearly seen on many occasions on today's highways. The combined effect of the loss of control in the steering of an automobile resulting from the loading effect of a trailer together with the difficulty of controlling the extent of movement of a trailer cooperate to produce a net effect which is more hazardous than either of these very substantial difficulties taken separately.

SUMMARY OF THE INVENTION

The present invention overcomes the difficulties of the prior art by providing a trailer hitch for connecting a trailer to a tractor which comprises a draw bar, primary pivot means for connecting the draw bar to the tractor and secondary pivot means for connecting the draw bar to the trailer. Limiting means are provided for controlling the extent of pivoting permitted about the first pivot point and horizontal pivot control means are provided for preventing horizontal pivoting about the secondary pivot point means until horizontal pivoting about the primary pivot point means is completed.

The present invention also provides an improved trailer hitch including adjustable load control means for controlling the load distribution applied to the tractor by the trailer.

A further important feature of the present invention is the combination of the horizontal pivoting control means and the load distribution means which provides a trailer hitch which is inexpensive to manufacture and simple to install and which greatly improves the control which the operator of the tractor vehicle has over the movement of the trailer.

The invention will be more clearly understood after reference to the following detailed specification read in conjunction with the drawings wherein:

FIG. 3 is an enlarged perspective view of the underside of the secondary pivot coupling.

Figure 1:
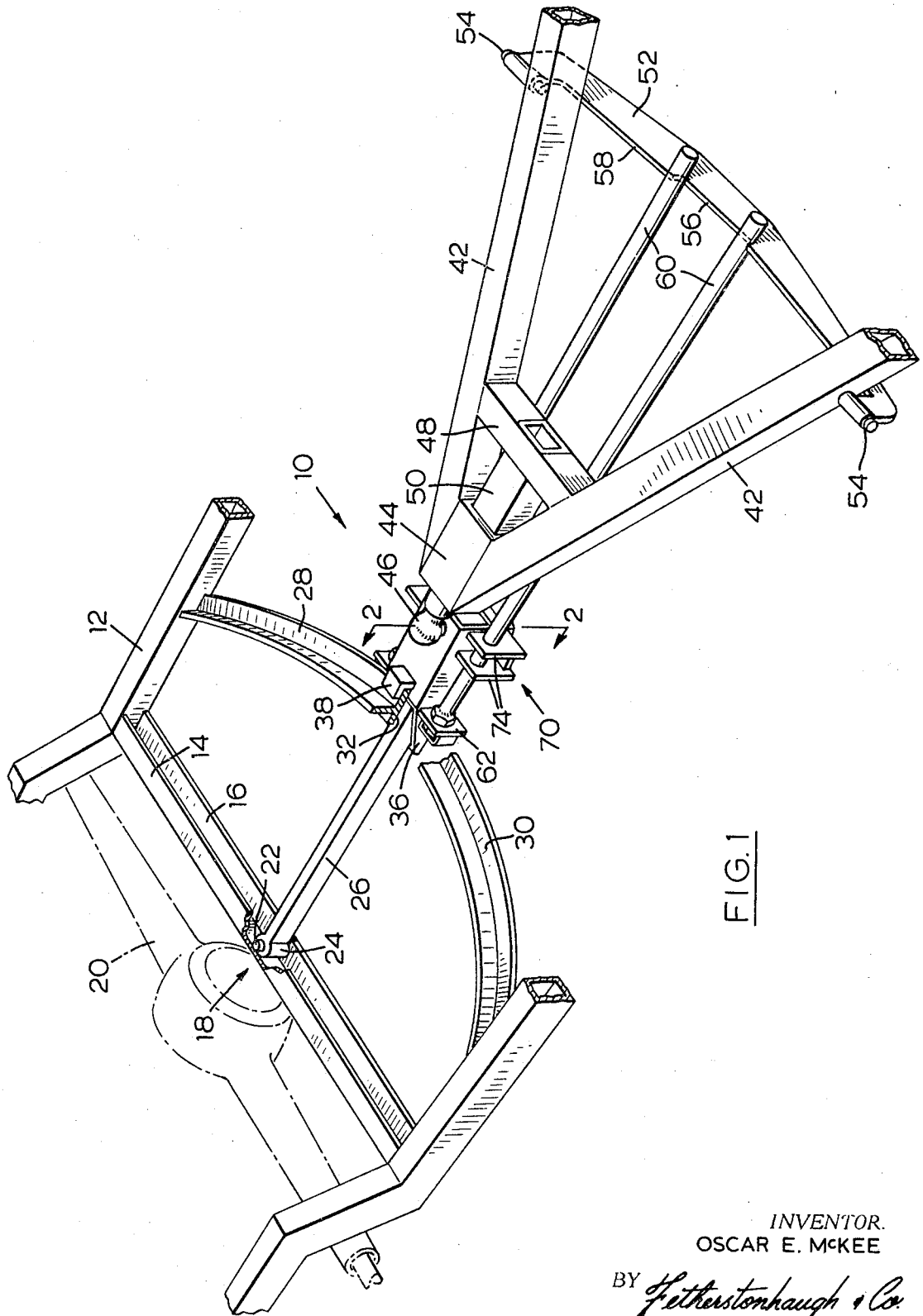
FIG. 1 is a perspective view of a trailer hitch according to an embodiment of the present invention.

Referring to FIG. 1 of the drawings the reference numeral 10 refers generally to a trailer hitch according to an embodiment of the present invention. The trailer hitch 10 is secured to the frame or chassis 12 of an automobile or the like by means of a pair of cross straps 14 and 16 which may be welded, bolted or otherwise rigidly secured to the chassis 12. An important feature of the present invention is the location of the primary pivot point generally indicated by the reference numeral 18 adjacent to the rear axle 20 of the automobile. The axis about which a conventional automobile pivots while turning is located at the rear axle and consequently the closer the primary pivot point 18 is to the rear axle the less will be the movement of the primary pivot point when the vehicle turns about the axle. The primary pivot means 18 consists of a pivot pin 22 which passes through suitable openings formed in the cross straps 14 and 16 and the eye 24 formed at the forward end of the draw bar 26. The pivot pin 22 is preferably removably mounted such that it may be withdrawn to release the draw bar 26 as required in use. The pivoting of the draw bar 26 about the primary pivot means 18 is in a horizontal plane and the rear end of the draw bar is maintained in a horizontal plane by an arcuate shaped support 28. The support 28 is rigidly secured to the chassis 12 and has a curvature generated from a center of rotation coincident with the axis of the pivot pin 22. The support 28 is preferably T-shaped in cross section to provide bearing surfaces 30 and 32.

The rear end 34 of the draw bar 26 is adapted to fit in a close fitting relationship within a hollow box-section coupling head 36. The box-section coupling head 36 may be permanently secured to the rear end of the draw bar 26 by welding or it may be releasably secured by suitable removable bolts or locking pins (not shown). It is preferable that the connection between the coupling head 36 and the rear end of the draw bar be in the form of releasable bolts in order that it may be removed when the hitch is not in use. A small lug 38 projects upwardly from the upper surface of the box 36 and has a lip extending over the bearing surface 30 of the support bar 28. The bearing surface 32 of the support bar 28 bears against the top surface of the coupling head 36.

Figure 2:
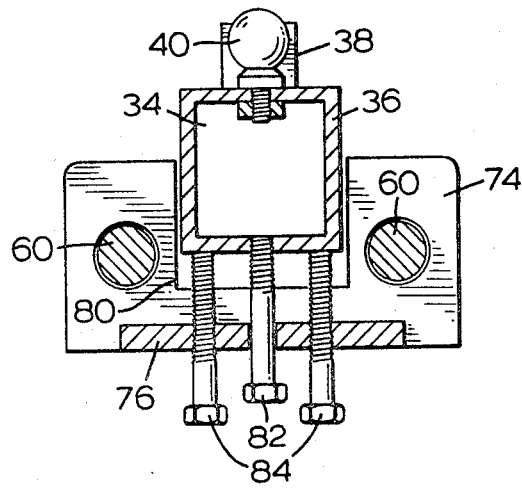
FIG. 2 is a sectional view taken along the line 2—2 of FIG. 1.

A conventional ball joint 40 is bolted to the upper surface of the coupling head 36 as shown in FIG. 2 and is located adjacent the rear end thereof.

The frame of the trailer has a pair of forwardly directed box-shaped members 42 which are connected at their forward end by an end piece 44. A conventional ball socket 46 is secured to the end piece 44 and is adapted to receive the ball 40 carried by the coupling head 36. The cooperating ball 40 and socket 46 form the secondary pivot hinge about which pivoting occurs as will be described hereinafter. Suitable additional reinforcing members 48 and 50 also form part of the frame of the trailer. A stabilizer rod support member 52 is spaced inwardly from the forward end of the frame of the trailer and is pivotably connected to the members 42 of the trailer frame by suitable pivot pins 54. The support member 52 may be mounted in the manner of the quick release type of torsion bar now in use, but an important feature of the present support member 52 is that it should not be free to permit any side-to-side movement relative to the chassis of the trailer. The upper edge of the stabilizer rod support member 52 is formed with a recess 56 which is located centrally thereof. A pair of downwardly inclined support edges 58 form the upper edges of support member 52. The edges 58 and recess 56 influence the pivoting of the trailer about the secondary pivot point as will be described hereinafter.

A pair of lugs 62 are rigidly secured as by welding to the side walls of the coupling head 36. The lugs 62 are each formed with openings 64 which extend therethrough. A U-shaped cap 66 is welded to each lug 62 and forms a stop wall 68 spaced outwardly from the lug 62. A pair of stabilizer rods 60 each have hexagonal end portions 72 adapted to fit within the hexagonal openings 64 formed in the lugs 62. The stabilizer rods 60 may be removed and replaced by stabilizer rods of different strength according to the requirements of the use of the hitch. The stabilizer rods 60 extend rearwardly from the lugs 62 to overlie the stabilizer rod support member 52 as previously described.

Horizontal pivoting of the trailer about the secondary pivot is controlled by the stabilizer rods 60 and the support 52. As will be seen from FIG. 1 the stabilizer rods 60 are located in the recess 56 when the trailer is in axial alignment with the draw bar 26. In order to move from this axially aligned position at least one of the stabilizer rods must ride up out of the recess 56 to bear against the support surface 58. Movement of the stabilizer rods 60 out of the recess can only result from deformation of the rods 60. As previously indicated the support edges 58 are downwardly inclined toward the recess 56 such that the deformed stabilizer rod will always tend to return to the recess 56 thereby tending to cause the trailer to move into axial alignment with the draw bar 26.

The stabilizer rods 60 also cooperate with the support 52 to distribute the trailer load relative to the tractor and suitable adjustment means generally indicated by the reference numeral 70 and shown in detail in FIGS. 2 and 3 is adapted to adjust the preset load applied to the stabilizer rods. The adjustment means 70 includes a pair of side wall plates 74 and a base plate 76. The side wall plates 74 each have openings 78 formed therein which are adapted to receive the stabilizer rods 60. The stabilizer rods 60 are a sliding fit in the opening 78. Each of the side wall plates 74 has a recess 80 formed therein to receive the end of the box-shaped section 36 as shown in FIG. 3. The adjustment means 70 is secured against relative movement to the coupling head 36 by a suitable bolt 82 which passes through a suitable clearance opening in the base plate 76. Load adjustment screws 84 threadably engage the base plate 76 and abut the underface of the coupling 36. A load may be applied to the stabilizer bars 60 by adjustment of the screws 84 towards the coupling 36. This adjustment has the effect of moving the adjustment means 70 away from the coupling head 36 and applying a bending force to the stabilizer rods 60. The load applied to the stabilizer rods 60 by the adjustment means 70 is transferred to the stabilizer rod support 52 and serves to urge the stabilizer rods 60 to their axially aligned position wherein they are located within the recess 56. By increasing the load applied to the stabilizer rods by the adjustment means 70 distribution of the weight of the trailer carried by the tractor can be varied. Normally a major portion of the weight of a trailer would be carried by the rear wheels of the tractor vehicle, however, by increasing the load applied by the stabilizer rods 60 the load carried by the rear wheels of the tractor vehicle can be reduced.

When the hitch is in use the coupling head 36 is rigidly secured relative to the draw bar 26. The trailer socket 46 is mounted in an operative position housing the ball 40 and the stabilizer rods 60 extend to the position wherein they are located within the recess 56 formed in the stabilizer rod support bar 52. Relative vertical movement between the tractor and the trailer takes place about the ball and socket coupling. It will be noted that vertical pivoting about the ball and socket joint will cause bending forces to be applied to the stabilizer rods 60 with the result that the stabilizer rods will resist the forces causing relative vertical movement between the tractor and the trailer. Furthermore the application of bending forces to the stabilizer rods by the vertical pivoting will tend to force the stabilizer rods downwardly on the downwardly inclined support surfaces 56 of the support 52 into the axially aligned position wherein they are located in the recess 56.

Figure 4:
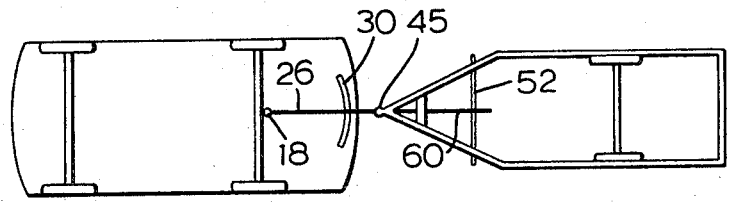
FIG. 4 is a diagrammatic plan view illustrating the location of the draw bar when the tractor and trailer are axially aligned with one another.
Figure 5:
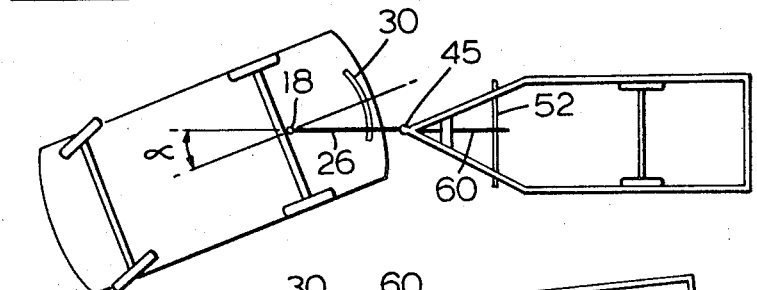
FIG. 5 is a plan view similar to FIG. 4 showing the tractor pivoting about the primary pivot point.
Figure 6:
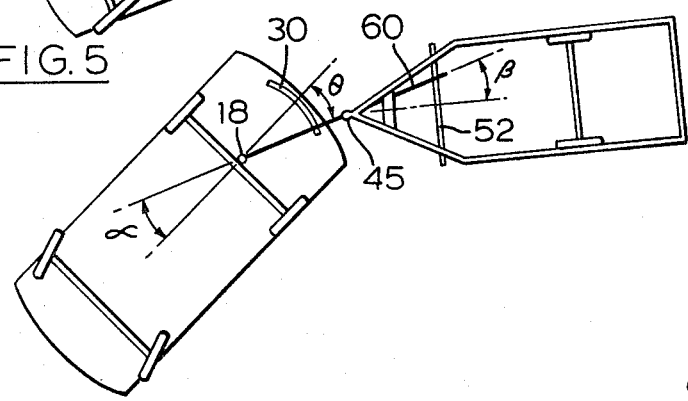
FIG. 6 is a plan view similar to FIGS. 4 and 5 showing the tractor pivoting about the primary and secondary pivot points.

In FIG. 4 of the drawings the tractor and trailer shown in the axially aligned position and the structure of the hitch is illustrated in the simplified form. As previously described the draw bar 26 is pivotably mounted adjacent the rear axle of the tractor vehicle at the primary pivot point 18. The trailer is connected to the draw bar by a ball and socket joint generally illustrated at 45 which forms the secondary pivot point. The stabilizer rods 60 extend to the support member 52 and serve to prevent horizontal pivoting about the secondary pivot point until horizontal pivoting about the primary pivot point has been completed. In FIG. 5 of the drawings the tractor vehicle is turned through an angle $\alpha$. It will be noted that the draw bar 26 and stabilizer rods 60 remain in axial alignment with one another and no pivoting occurs about the secondary pivot point 45. The angle $\alpha$ is formed between the centre line of the tractor vehicle and the axis of the draw bar 26. Referring now to FIG. 6 of the drawings it will be seen that as the tractor vehicle continues to turn relative to the trailer vehicle the draw bar 26 reaches the end of the pivoting which is permitted by the horizontal pivot control means 30. Further pivoting of the tractor relative to the trailer is effected by displacement of the stabilizer rods 60 through an angle $\beta$ relative to the axis of the trailer. The angle $\theta$ formed between the longitudinal axis of the trailer and the longitudinal axis of the tractor is equal to the sum of the angles $\alpha$ and $\beta$. When the tractor and trailer begin to return to the axially aligned position by reducing the angle $\theta$ the forces exerted by the stabilizer rods 60 will tend to cause reduction in the angle $\beta$ by pivoting about the secondary pivot point before pivoting about the primary pivot point. This will ensure that the greater control which is available as a result of pivoting about the primary pivot point will be returned as soon as possible.

It will be apparent from the foregoing that the stabilizer rods 60 perform several important functions. These functions include resisting the vertical pivoting which takes place about the secondary pivot point 45, resisting the horizontal pivoting which may take place about the secondary pivot 45, cooperating with the support means 52 to return the tractor and trailer to the axially aligned position and in addition the stabilizer rods may be employed to effect an even distribution of the load of the trailer carried by the tractor. The load distribution function of the stabilizers and the resistance to pivoting about the secondary pivot point 45 are both related to the weight of the tractor vehicle and consequently the control of both of these reactions by means of the adjustment of the stabilizer rods provides a very convenient combination of these features.

From the aforegoing it will be apparent that the present invention provides an improved trailer hitch which is inexpensive to manufacture but which provides greatly improved control of the movements of a trailer vehicle by the tractor.

Various modifications of the present invention will be apparent to those skilled in the art without departing from the spirit of the present invention. For example, the inclined upper surface of the stabilizer rod support member which acts as the centering means for realignment after pivoting about the secondary pivot may be replaced by shock absorbers or the like which would also act to center the stabilizer rods. A further minor modification may include the provision of a ball joint connection at the primary pivot point, this is particularly desirable where the coupling is directly connected to the rear axle of the trailer and must move relative to the chassis.

As previously discussed it will be apparent that the present invention overcomes the difficulties associated with the long overhang of the rear end of an automobile which normally causes the front end of the trailer to move in the opposite direction to the rear end of the tractor. With the known hitches sudden changes in steering direction tends to start a sway that can become very dangerous. The present invention eliminates these difficulties by providing a primary pivot point adjacent to the rear axle of the vehicle and centering means for returning the draw bar to an axially aligned position relative to the trailer after pivoting about the secondary pivot point.

What I claim is:

1. A trailer hitch for connecting a trailer to a tractor comprising, a draw bar, primary pivot means for connecting said draw bar to a tractor, secondary pivot means for connecting said draw bar to a trailer, limiting means for controlling the extent of pivoting permitted about said primary pivot, draw bar alignment means for maintaining said draw bar in a normal position with said first and second pivot means in alignment with said trailer by preventing horizontal pivoting of said trailer about said secondary pivot means until horizontal pivoting about said primary pivot means is complete.

2. A trailer hitch for connecting a trailer of the type which does not have steerable wheels to a tractor of the type which has a rear axle disposed a substantial distance inwardly from the rear end thereof comprising, a draw bar having a forward end and a rear end, primary pivot mounting means for pivotably mounting said forward end of said draw bar to said tractor adjacent the rear axle to permit primary horizontal pivoting of said draw bar relative to said tractor, stop means for limiting the extent of horizontal pivoting movement of said draw bar relative to said tractor within a predetermined arc, secondary pivot means for connecting said rear end of said draw bar to a trailer, said secondary pivot means being adapted to permit vertical and horizontal pivoting between said trailer and said tractor, draw bar alignment means for maintaining said draw bar in a position with said first and second pivot means in axial alignment with said trailer to prevent horizontal pivoting about said secondary pivot means until horizontal pivoting of said draw bar about said primary pivot is prevented by said stop means.

3. A trailer hitch for connecting a trailer to a tractor comprising, a draw bar having a forward end and a rear end, primary pivot means for pivotably mounting said forward end of said draw bar to said tractor to permit primary horizontal pivoting of said draw bar relative to said tractor, stop means for limiting the extent of horizontal pivoting movement of said draw bar relative to said tractor within a predetermined arc, secondary pivot means for connecting said rear end of said draw bar to a trailer, said secondary pivot means being adapted to permit vertical and horizontal pivoting between said trailer and said tractor, horizontal pivot control means for preventing horizontal pivoting about said secondary pivot means until horizontal pivoting of said draw bar about said primary pivot is prevented by said stop means, said horizontal pivot control means including stabilizer means for maintaining said draw bar in a normal position in axial alignment with the longitudinal axis of said trailer.

4. A trailer hitch for connecting a trailer to a tractor comprising, a draw bar having a forward end and a rear end, primary pivot means for pivotably mounting said forward end of said draw bar to said tractor to permit primary horizontal pivoting of said draw bar relative to said tractor, stop means for limiting the extent of horizontal pivoting movement of said draw bar relative to said tractor within a predetermined arc, secondary pivot means for connecting said rear end of said draw bar to a trailer, said secondary pivot means being adapted to permit vertical and horizontal pivoting between said trailed and said tractor, horizontal pivot control means for preventing horizontal pivoting about said secondary pivot means until horizontal pivoting of said draw bar about said primary pivot is prevented by said stop means, said horizontal pivot control means including stabilizer rod means having one end connected to said rear end of said draw bar and extending rearwardly therefrom towards said trailer, stabilizer rod supporting means carried by said trailer for supporting the rearwardly disposed end of said stabilize rod means, said support means being formed with retaining means cooperating with said stabilizer rod means to maintain said draw bar in a normal position in alignment with the longitudinal axis of said trailer, said stabilizer rod means being disengageable from said retaining means in response to the application of a predetermined pivoting force to permit said draw bar to pivot horizontally about said secondary pivot means.

5. A trailer hitch for connecting a trailer to a tractor comprising, a draw bar having a forward end and a rear end, primary pivot means for pivotably mounting said forward end of said draw bar to said tractor to permit primary horizontal pivoting of said draw bar relative to said tractor, stop means for limiting the extent of horizontal pivoting movement of said draw bar relative to said tractor within a predetermined arc, secondary pivot means for connecting said rear end of said draw bar to a trailer, said secondary pivot means being adapted to permit vertical and horizontal pivoting between said trailer and said tractor, horizontal pivot control means for preventing horizontal pivoting about said secondary pivot means until horizontal pivoting of said draw bar about said primary pivot is prevented by said stop means, said horizontal pivot control means comprising a pair of stabilizer rods each having one end connected to the rear end of said draw bar and extending rearwardly therefrom towards said trailer, a stabilizer rod support member mounted on said trailer and having a support surface underlying and supporting the other ends of said rods, recess means formed in said support surface for retaining said other ends of said stabilizer rods in a normal position wherein said draw bar is in axial alignment with said trailer, said stabilizers being deformable to be removed from said recess to permit said draw bar to pivot about said second pivot point in response to the application of a predetermined pivoting load.

6. A trailer hitch for connecting a trailer to a tractor comprising, a draw bar having a forward end and a rear end, primary pivot means for pivotably mounting said forward end of said draw bar to said tractor to permit primary hoizontal pivoting of said draw bar relative to said tractor, stop means for limiting the extent of horizontal pivoting movement of said draw bar relative to said tractor within a predetermined arc, secondary pivot means for connecting said rear end of said draw bar to a trailer, said secondary pivot means being adapted to permit vertical and horizontal pivoting between said trailer and said tractor, horizontal pivot control means for preventing horizontal pivoting about said secondary pivot means until horizontal pivoting of said draw bar about said primary pivot is prevented by said stop means, and adjustment means for adjusting the horizontal pivotal force required to permit horizontal pivoting about said second pivot point.

7. A trailer hitch as claimed in claim 5 including adjustment means for applying said predetermined load to said stabilizer bars.

8. A trailer hitch as claimed in claim 5 wherein said support surface of said stabilizer rod support member is upwardly inclined in a direction away from said recess means to constantly urge said stabilizer rods toward said normal position in said recess when said rods are displaced therefrom.

9. A trailer hitch for connecting a trailer to a tractor comprising, a draw bar having a forward end and a rear end, primary pivot means for pivotably mounting said forward end of said draw bar to said tractor to permit primary horizontal pivoting of said draw bar realtive to said tractor, stop means for limiting the extent of horizontal pivoting movement of said draw bar realtive to said tractor within a predetermined arc, secondary pivot means for connecting said rear end of said draw bar to a trailer, said secondary pivot means being adapted to permit vertical and horizontal pivoting between said trailer and said tractor, horizontal pivot control means for preventing horizontal pivoting about said secondary pivot means until horizontal pivoting of said draw bar about said primary pivot is prevented by said stop means, including adjustable load control means for controlling the distribution of the load applied to the tractor by the trailer.

10. A trailer hitch as claimed in claim 9 wherein said load control means includes, stabilizer rod means having one end connected to said rear end of said draw bar and extending rearwardly therefrom towards said trailer, stabilizer rod support means carried by said trailer for supporting the rearwardly disposed end of said stabilizer rods, adjustable loading means for applying a bending load to said stabilizer rods to thereby apply a load to said stabilizer rod support means to control the distribution of the trailer load applied to the tractor.

11. A trailer hitch as claimed in claim 10 wherein said adjustment means includes, jacking means adapted to displace said stabilizer rod means relative to said rear end of said draw bar.

12. A trailer hitch as claimed in claim 4 including adjustable loading means for applying a bending load to said stabilizer rod means to thereby apply a load to said stabilizer rod support means to control the distribution of the trailer load applied to the tractor.

13. A trailer hitch as claimed in claim 1 including centering means for returning said trailer to an axially aligned position relative to said draw bar after pivoting about said secondary pivot point.

14. A trailer hitch as claimed in claim 2 including centering means for returning said trailer to an axially aligned position relative to said draw bar after pivoting about said secondary pivot point.

15. A trailer hitch as claimed in claim 5 including centering means for returning said trailer to an axially aligned position relative to said draw bar after pivoting about said secondary pivot point.

References Cited

UNITED STATES PATENTS

| 2,126,819 | 8/1938 | Schawlem | 280—423-AUX |
| 2,517,047 | 8/1950 | Spitler | 280—406.1UX |
| 2,685,454 | 8/1954 | Patchett | 280—461 |
| 2,940,776 | 6/1960 | Curtis | 280—446 |
| 3,101,959 | 8/1963 | Adams | 280—432 |
| 3,353,842 | 11/1967 | Lewis | 280—406(.1)X |

LEO FRIAGLIA, Primary Examiner

U.S. Cl. X.R.

280—446